US011420182B2

(12) United States Patent
Bai et al.

(10) Patent No.: US 11,420,182 B2
(45) Date of Patent: Aug. 23, 2022

(54) HYDROPHOBIC SORBENTS FOR CO₂/H₂O DISPLACEMENT DESORPTION APPLICATIONS

(71) Applicants: ExxonMobil Technology and Engineering Company, Annandale, NJ (US); TDA Research, Inc., Wheat Ridge, CO (US)

(72) Inventors: Chuansheng Bai, Phillipsburg, NJ (US); Majosefina Cunningham, Whitehall, PA (US); Patrick P. McCall, Matawan, NJ (US); Hans Thomann, Bedminster, NJ (US); Jeannine Elizabeth Elliott, Superior, CO (US); Vinh Nguyen, Arvada, CO (US)

(73) Assignees: ExxonMobile Technology and Engineering Company, Annandale, NJ (US); TDA Research, Inc. W, Wheat Ridge, CO (US)

( * ) Notice: Subject to any disclaimer, the term of this patent is extended or adjusted under 35 U.S.C. 154(b) by 749 days.

(21) Appl. No.: 15/910,212

(22) Filed: Mar. 2, 2018

(65) Prior Publication Data
US 2018/0250653 A1    Sep. 6, 2018

Related U.S. Application Data

(60) Provisional application No. 62/466,811, filed on Mar. 3, 2017.

(51) Int. Cl.
| | |
|---|---|
| *B01J 20/04* | (2006.01) |
| *B01J 20/10* | (2006.01) |
| *B01J 20/08* | (2006.01) |
| *B01J 20/34* | (2006.01) |
| *B01J 20/32* | (2006.01) |

(Continued)

(52) U.S. Cl.
CPC ............ *B01J 20/041* (2013.01); *B01D 53/02* (2013.01); *B01J 20/08* (2013.01); *B01J 20/103* (2013.01);
(Continued)

(58) Field of Classification Search
CPC ........ B01J 20/041; B01J 20/08; B01J 20/103; B01J 20/22; B01J 20/3078; B01J 20/3204;
(Continued)

(56) References Cited

U.S. PATENT DOCUMENTS

| 5,378,440 A | 1/1995 | Herbst et al. |
| 9,446,343 B2 | 9/2016 | Elliott et al. |

(Continued)

OTHER PUBLICATIONS

Castricum, Hessel L. et al., Hydrophobisation of mesoporous y-Al2O3 with organochlorosilanes-efficiency and structure, Microporous and Mesoporous Materials, 2005, pp. 1-9, vol. 83, Elesevier.
(Continued)

*Primary Examiner* — James A Fiorito
(74) *Attorney, Agent, or Firm* — Troutman Pepper Hamilton Sanders LLP; John A. Morrissett; Scott A. Bergeson

(57) ABSTRACT

The disclosure generally relates to CCS sorbents, particularly for $CO_2/H_2O$ displacement desorption process. The sorbent includes an aluminum oxide support and an alkali metal salt impregnated on the support, and a silicon modification of the sorbent to reduce water uptake by the sorbent and make it more hydrophobic. The silicon modification can be an organosilyl moiety added after the initial sorbent is complete, or a silica source added to the aluminum oxide structure, typically via impregnation. The sorbents demonstrate better $H_2O/CO_2$ ratios. Compositions and methods of making are disclosed.

13 Claims, 2 Drawing Sheets

(51) Int. Cl.
*B01J 20/30* (2006.01)
*B01D 53/02* (2006.01)
*B01J 20/22* (2006.01)

(52) U.S. Cl.
CPC ............ *B01J 20/22* (2013.01); *B01J 20/3078* (2013.01); *B01J 20/3204* (2013.01); *B01J 20/3234* (2013.01); *B01J 20/3433* (2013.01); *B01J 20/3466* (2013.01); *B01D 2253/104* (2013.01); *B01D 2253/106* (2013.01); *B01D 2253/1124* (2013.01); *B01D 2253/20* (2013.01); *B01D 2253/25* (2013.01); *B01D 2257/504* (2013.01); *B01D 2258/0283* (2013.01); *B01D 2259/40086* (2013.01)

(58) Field of Classification Search
CPC ................ B01J 20/3234; B01J 20/3433; B01J 20/3466; B01D 53/02
See application file for complete search history.

(56) References Cited

U.S. PATENT DOCUMENTS

| | | |
|---|---|---|
| 9,504,955 B2 | 11/2016 | Elliott et al. |
| 9,527,029 B2 | 12/2016 | Elliott et al. |
| 9,539,540 B2 | 1/2017 | Elliott et al. |
| 2002/0157535 A1 | 10/2002 | Kanazirev et al. |
| 2003/0232722 A1 | 12/2003 | Kato et al. |
| 2004/0011198 A1 | 1/2004 | Keefer et al. |
| 2015/0321166 A1 | 11/2015 | Kim et al. |

OTHER PUBLICATIONS

International Search Report and Written Opinion issued in related International Application No. PCT/US18/20639 dated May 16, 2018.

HYDROPHOBIC SORBENTS FOR CO$_2$/H$_2$O DISPLACEMENT DESORPTION APPLICATIONS

CROSS REFERENCE TO RELATED APPLICATIONS

This application claims the benefit of U.S. Provisional Application No. 62/466,811, filed 3 Mar. 2017, which is entirely incorporated herein by reference.

STATEMENT REGARDING FEDERALLY SPONSORED RESEARCH

Portions of this disclosure were made with government support under Contract No. DE-FE0012870, awarded by the Department of Energy. The government may have certain rights in the invention.

TECHNICAL FIELD

The various embodiments of the disclosure relate generally to methods for making and compositions of hydrophobic sorbents. It is particularly useful for preparing sorbents for CO$_2$/H$_2$O displacement desorption processes, in which the sorbent has been made more hydrophobic by the including of silicon sources.

BACKGROUND

Fossil fuels currently supply the majority of world's energy needs and their combustion is the largest source of anthropogenic carbon dioxide emissions. Carbon dioxide is a greenhouse gas and is believed to contribute to global climate change. Concern over global climate warming has led to interest in capturing CO$_2$ emissions from the combustion of fossil fuels. The quantities of combustion gas produced in electric power generation are large because of the scale of furnaces and turbines utilized. One measure of the scale of these operations is the amount of CO$_2$ produced in a typical 500 Megawatt power plant, for coal fired power generation, the rate of CO$_2$ production is on the order of 100 kg per second; for gas fired power production it is more like 50 kg per second.

CO$_2$ can be removed from combustion flue gas streams by various methods, often referred to a carbon capture and sequestration (CCS.) The challenge for CO$_2$ capture from flue gas is to do it efficiently to minimize the cost. All post-combustion CO$_2$ capture technologies suffer from the disadvantages that the CO$_2$ in the flue gas is present at low pressure (1 atmospheric pressure) and in low concentrations (3 to 15%). A large amount of energy is needed to separate CO$_2$. Developing methods that minimize the amount of energy and other costs will be necessary if CO$_2$ removal from flue gas is to be economical. Methods for the removal of CO$_2$ from flue gas streams include adsorption with a solvent, adsorption with a sorbent, membrane separation, and cryogenic fractionation and combinations thereof. In absorption/adsorption processes to capture CO$_2$, the energy needed to regenerate the sorbent or solvent is also a large cost element.

CO$_2$ displacement desorption process uses a competitive adsorption of H$_2$O to drive off adsorbed CO$_2$ on sorbent. During CO$_2$ capturing step, CO$_2$ of the flue gas displaces the adsorbed H$_2$O on the sorbent. Displacement desorption swings the concentrations of H$_2$O and CO$_2$. It is an isothermal process and has no need for pressure swing.

BRIEF SUMMARY

The various embodiments of the disclosure relate generally to methods for preparing and compositions of silicon-modified sorbents.

An embodiment of the disclosure can be a silicon-modified CO$_2$/H$_2$O displacement desorption sorbent, comprising an aluminum compound support; an alkali metal salt; and a silicon source capping hydroxyl positions on the aluminum compound support.

In some embodiments, the silicon source can be 5% to 20% by weight of silica impregnated on the aluminum support. The silicon source can be 7% to 15% by weight of silica impregnated on the aluminum support.

In some embodiments, the silicon source comprises an organosilyl moiety. The organo silyl moiety can be a triorganosilyl halide or triflate. In some embodiments, the organo silyl moiety can be a trialkyl silyl moiety. The alkyl fragment of the trialkylsilyl moiety can be methyl, ethyl, or propyl, or combinations thereof. In some embodiments, the trialkyl silyl moiety is a trialkylsilyl halide or triflate. The organosilyl moiety can be trimethylsilyl chloride.

An embodiment of the disclosure can be a method for reducing parasitic water sorption/desorption for CO$_2$/H$_2$O displacement desorption sorbents, comprising surface modifying a sorbent with a silicon source. The sorbent can be an aluminum compound impregnated with an alkali metal; and the silicon source can be either an organosilyl moiety added to the sorbent after impregnating with the alkali metal; or a silica added to the aluminum compound prior to impregnating with the alkali metal.

In some embodiments, the silicon source comprises an organosilyl moiety. The organo silyl moiety can be a triorganosilyl halide or triflate. In some embodiments, the organo silyl moiety can be a trialkyl silyl moiety. The alkyl fragment of the trialkylsilyl moiety can be methyl, ethyl, or propyl, or combinations thereof. In some embodiments, the trialkyl silyl moiety is a trialkylsilyl halide or triflate. The organosilyl moiety can be trimethylsilyl chloride.

In some embodiments, the silicon source can be 5% to 20% by weight of silica impregnated on the aluminum support. The silicon source can be 7% to 15% by weight of silica impregnated on the aluminum support.

An embodiment of the disclosure can be a method for preparing a hydrophobic CO$_2$/H$_2$O displacement desorption sorbent, including the steps of impregnating an aluminum compound support with silica; drying and then calcining the silica-impregnated support; depositing an alkali metal salt on the silica-aluminum support; and calcining the support to form the sorbent.

In some embodiments, the silicon source can be 5% to 20% by weight of silica impregnated on the aluminum support. The silicon source can be 7% to 15% by weight of silica impregnated on the aluminum support.

In some embodiments, the aluminum compound can be aluminum oxide, aluminum oxide hydroxide, aluminum hydroxide, boehmite, or pseudoboehmite. In some embodiments, the alkali metal salt can be a potassium salt, a sodium salt, or a lithium salt, or a combination thereof. In some embodiments, the alkali metal salt can be greater than about 5 weight % of the sorbent as M$_2$O, or can be greater than about 8 weight % of the sorbent as M$_2$O.

An embodiment of the disclosure can be a method for preparing a hydrophobic CO$_2$/H$_2$O displacement desorption sorbent, including the steps of preparing an aluminum compound mixture; drying and then calcining the mixture to form a support; depositing an alkali metal salt on the support; and calcining the support to form the sorbent, and treating the sorbent with an organo silyl moiety.

In some embodiments, the silicon source comprises an organosilyl moiety. The organo silyl moiety can be a triorganosilyl halide or triflate. In some embodiments, the organo silyl moiety can be a trialkyl silyl moiety. The alkyl fragment of the trialkylsilyl moiety can be methyl, ethyl, or propyl, or combinations thereof. In some embodiments, the trialkyl silyl moiety is a trialkylsilyl halide or triflate. The organosilyl moiety can be trimethylsilyl chloride.

In some embodiments, the aluminum compound can be aluminum oxide, aluminum oxide hydroxide, aluminum hydroxide, boehmite, or pseudoboehmite. In some embodiments, the alkali metal salt can be a potassium salt, a sodium salt, or a lithium salt, or a combination thereof. In some embodiments, the alkali metal salt can be greater than about 5 weight % of the sorbent as $M_2O$, or can be greater than about 8 weight % of the sorbent as $M_2O$.

DETAILED DESCRIPTION

Figure 1:
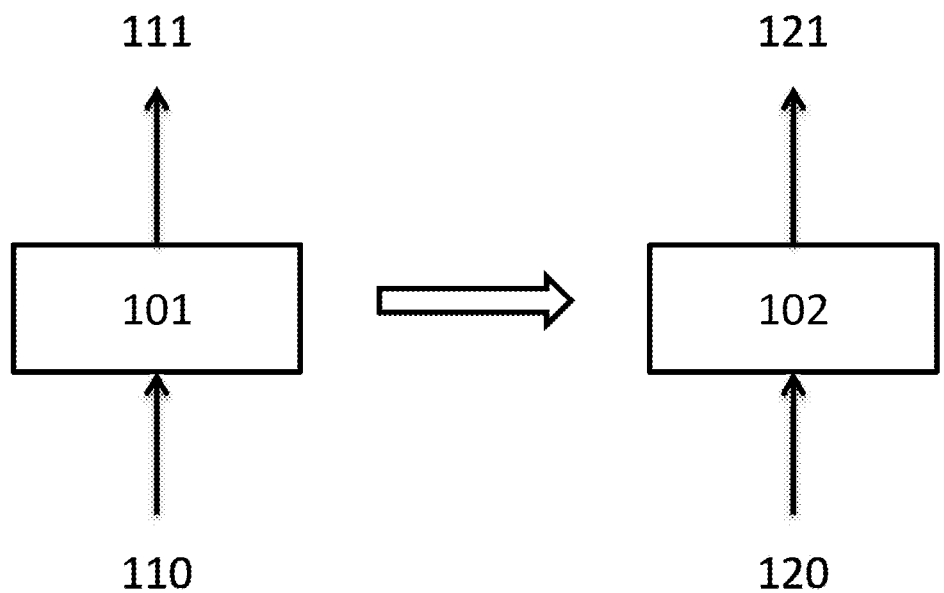
FIG. 1 illustrates a simplified system of $CO_2/H_2O$ displacement desorption system in which a sorbent of the disclosure would be applied, in accordance with an exemplary embodiment of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Embodiments of this disclosure include sorbent for use in a CCS process, particularly $CO_2/H_2O$ displacement desorption, and methods for creating a more hydrophobic surface on these sorbents. FIG. 1 demonstrates a simplified system of $CO_2/H_2O$ displacement desorption, in which a sorbent of this disclosure might be applied. System 100 includes two sorbent bed positions, 101 and 102, in which the sorbents of this disclosure would be placed. Sorbent bed position 101 contains a sorbent that is initially $CO_2$ poor. A $CO_2$ rich stream, 110, e.g. a flue gas feed from a combustion source, passes across sorbent bed 101, which absorbs the $CO_2$, and a $CO_2$ depleted stream exits the bed. Once sorbent bed 101 is saturated, it can move to sorbent bed position 102. A steam feed 120 containing water vapor, can enter the $CO_2$ saturated sorbent bed 102 and cause desorption and displacement of the $CO_2$ from the sorbent. The exit gas stream is then a $CO_2$ rich stream that can then be further processed. Once sorbent bed 102 is regenerated, it can return to position 101. Several applications of this system have been demonstrated, such as in U.S. Pat. Nos. 9,504,955; 9,446,343; 9,539,540; and 9,527,029.

The typical sorbent used in $CO_2/H_2O$ displacement desorption is an alkali metal salt impregnated on an aluminum oxide catalyst, particularly using a potassium salt. $K_2CO_3/Al_2O_3$ is a preferred sorbent currently. In the $CO_2/H_2O$ displacement desorption process, steam usage is divided into two portions. One portion is used to drive off the $CO_2$ absorbed on the sorbent. Another portion is water absorbed on the sorbents via hydrogen binding to the hydroxyl groups of the sorbents. This second portion is effectively a wasteful or parasitic portion, and does not drive the process. Hydroxyl group concentrations and hydrophobic properties of the sorbents are key factors controlling $H_2O$ uptake on sorbents.

Thus, key technical challenges in $CO_2$ displacement desorption process includes increasing sorbent's $CO_2$ sorption capacity and minimizing steam usage. Steam generation requires intensive energy consumption and accounts for the large portion of operating costs. Hydrophobic sorbents can minimize parasitic amount of water absorbed on the sorbents and reduce steam usage in CCS operation.

This disclosure includes silicon-modified sorbents, and methods of making the same. In particular, the disclosure includes a silicon-modified $CO_2/H_2O$ displacement desorption sorbent, which comprises an aluminum compound support, an alkali metal salt impregnated on the aluminum compound support, and a silicon source capping at least a portion of the hydroxyl positions on the aluminum compound support. The silicon source can include a silica impregnated on the aluminum compound support, or an organosilyl moiety.

This disclosure includes a method for reducing parasitic water sorption/desorption for $CO_2/H_2O$ displacement desorption sorbents, which includes surface modifying a sorbent with a silicon source. The sorbent can be an aluminum compound impregnated with an alkali metal, and the silicon source can be an organosilyl moiety added to the sorbent after impregnating with the alkali metal or a silica added to the aluminum compound prior to impregnating with the alkali metal.

This disclosure includes a method for preparing a hydrophobic $CO_2/H_2O$ displacement desorption sorbent, including the steps of impregnating an aluminum compound support with silica, drying and then calcining the silica-impregnated support, depositing an alkali metal salt on the silica-aluminum support, and calcining the support to form the sorbent.

This disclosure also includes a method for preparing a hydrophobic $CO_2/H_2O$ displacement desorption sorbent, including the steps of preparing an aluminum compound mixture; drying and then calcining the mixture to form a support; depositing an alkali metal salt on the support; calcining the support to form the sorbent, and treating the sorbent with an organo silyl moiety.

The sorbents and methods can include an organosilyl moiety or reagent. One exemplary but non-limiting example of an organo silyl moiety is a trimethylsilyl group, i.e. TMS. Organosilyl moieties of the disclosure are silicon moieties that can bond to a hydroxyl group via the silicon atom. The organosilyl moiety can typically be a mono-, di-, or tri-organosilyl moiety, or can be a mono-alkyl, di-alkyl, or trialkyl silyl moiety. Exemplary alkyl groups in the organosilyl moieties can include methyl, ethyl, propyl, or butyl, or aryl, branched or unbranched. The alkyl groups in a di- or tri-silyl moiety can be the same or different. By way of example, the organosilyl moiety could be a trimethyl silyl group capping an oxygen in the support, or could be a di-methyl silyl group that is bound to two oxygens. Preferably, the organo silyl moiety is a trimethylsilyl, ethyl-dimethyl-silyl, diethyl-methyl-silyl, or triethylsilyl, more preferably trimethyl silyl.

One of skill in the art would appreciate that an organosilyl moiety that has reacted with a surface would be described as the fragment bound to the surface. Alternatively, the organosilyl moiety that is used in a method would be added as an organosilyl fragment bound to, typically, a leaving group. Traditional leaving groups for organosilyl fragments would include halides, triflates, tosylates, dialkylaminos, (e.g. N,N-Diethyl-1,1,1-trimethylsilylamine) and the such. Thus, the organosilyl moiety in a method can be organosilyl halides, organosilyl triflates, organosilyl tosylates, or organosilyl-di-alkyl amine, preferably organosilyl halides or organosilyl triflates, and more preferably organosilyl halides.

The sorbents and methods can include silica impregnated on the support. Silica can be added to an aluminum oxide compound and mixed prior to extruding, drying and calcining the aluminum oxide compound. Silica includes silica gels and oligomeric siloxanes, such as polydimethylsiloxane-co-methylphenylsiloxane, or other alkyls substituted for methyl, or mixed alkyls; hexamethyldisiloxane or other alkyls or mixed any alkyls; or aminofunctional oligomeric siloxane (such as Hydrosil). The silica can comprise at least about 5 wt % of the support, at least about 7 wt % of the support, at least about 8 wt % of the support, or at least about 10 wt % of the support. The silica can comprise up to about 20 wt % of the support, up to about 18 wt % of the support, or up to about 15 wt % of the support. The silica can be 5% to 20% by weight of the support, or 7% to 15% by weight of the support.

In the disclosure, the aluminum compound support includes any general aluminum oxide type compound, such as one of ordinary skill in the art would use in making aluminum oxide-type support structures. In an embodiment, the aluminum compound support can be comprises aluminum oxide, aluminum oxide hydroxide, aluminum hydroxide, boehmite, or pseudoboehmite. The aluminum oxides, oxide hydroxides, and hydroxides can include: aluminum oxides including γ-aluminum oxide, θ-aluminum oxide, corundum ($Al_2O_3$); aluminum oxide hydroxides such as diaspore (α-AlO(OH)), boehmite or böhmite (γ-AlO(OH)), akdalaite, including $5Al_2O_3.H_2O$ and $4Al_2O_3.H_2O$), also called tohdite; and aluminum hydroxides such as gibbsite, hydrargillite (hydrargyllite), bayerite, doyleite, nordstrandite, including α-Al(OH)$_3$, β-Al(OH)$_3$, γ-Al(OH)$_3$. In some preferred embodiments, the aluminum compound support comprises aluminum oxide hydroxide compounds, particularly, boehmite, or pseudoboehmite. While traditional $Al_2O_3$ compounds, as well as other aluminum oxide type compounds can work effectively, and without wishing to be bound by theory, the boehmite and pseudoboehmite compounds appear to be more effective in part because of the added hydroxylation of the aluminum composition, prior to drying and optionally calcining the support/extrudate.

An embodiment of the disclosure also includes impregnating the support with an alkali metal salt, or a sorbent that contains an alkali metal salt. This alkali metal salt can alternatively be described as the impregnating metal salt, because it is added to the support via impregnation to form the sorbent. By alkali metal salt is meant a Group 1 metal (group IA), including lithium (Li), sodium (Na), potassium (K), rubidium (Rb), and cesium (Cs). The alkali metal salt (i.e. impregnated alkali salt) can include lithium, sodium, potassium, rubidium, or cesium, or combinations thereof. The alkali metal salt can include lithium, sodium, potassium, or cesium, or combinations thereof. The alkali metal salt can include lithium, sodium, or potassium, or combinations thereof. The alkali metal salt can include potassium or sodium. The alkali metal salt can include potassium and sodium.

The amount of alkali metal salt, or the amount of alkali metal salt added to the support via impregnation during the method of making the support, can be at least about 5 wt % of the sorbent, at least about 6 wt % of the sorbent, at least about 7 wt % of the sorbent, at least about 8 wt % of the sorbent, at least about 9 wt % of the sorbent, at least about 10 wt % of the sorbent, at least about 11 wt % of the sorbent, or at least about 12 wt % of the sorbent. The percent weight of alkali metal is presented as weight $M_2O$ as a percentage of the total weight of the sorbent.

One of ordinary skill would understand that alkali metal salt in the context of this disclosure implies the alkali metal cation. As such, synonymous terms include alkali metal compound, alkali metal salt, alkali metal ion, alkali metal cation, an alkali salt, alkali ion, alkali compound, or alkali cation. The alkali metal salt can also in the context of this disclosure be referred to as an alkali metal composition.

Because the alkali metal salt is a cation, it will necessarily have a counterion, i.e. an anion. However, the nature of that anion is not a limiting issue. On the sorbent, particularly during operation, the anion can be a carbonate or bicarbonate counterion, or a hydroxyl or oxide anion that is part of the support to which the alkali metal is impregnated upon. Moreover, during preparation of the sorbents, and also as part of the sorbent when the salt is impregnated on the support, or when it's included as part of the extrudate, the alkali metal cation can have any counteranion one of ordinary skill would use. Nonlimiting examples of the anion can be hydroxides, halides, carbonates, bicarbonates, nitrates, nitrite, phosphate, hydrogen phosphate, dihydrogen phosphate, and organic acid salts including but not limited to acetate citrate, gluconate, and benzoic acid, etc.

Another embodiment of the disclosure can included the addition of an alkali metal salt to the aluminum compound during mixing to prepare the initial support. The aluminum compound and an alkali metal salt can be mixed together to form a dough which can be extruded, dried and optionally calcined. This alkali metal salt can be described as an extrudate alkali metal salt since it is contained within the extrudate that is used to make the support. As discussed in a co-pending provisional application filed by the same entity on the same day, and titled HIGH PERFORMANCE CCS SORBENTS AND METHODS OF MAKING SAME, which is incorporated by reference in its entirety as if set forth herein, an alkali metal can be introduced to the aluminum compound during mixing to form the dough, extruded, and dried and calcined to form the support. The extrudate alkali metal salt can be any alkali metal salt. The extrudate alkali metal salt can be a lithium salt, a sodium salt, a potassium salt, or combinations thereof. Preferably the alkali metal salt added to the mixture includes a potassium salt, a sodium salt, or both a potassium salt and a sodium salt. Once the extrudate is dried and calcined, next impregnation steps can occur, e.g. the impregnation of silica, or the impregnation of the impregnated alkali metal and eventual organosilyl treatment.

In some instances, the impregnating alkali metal salt can be two different alkali metal salts. For example, impregnating both potassium and sodium can provide improved performance and stability over impregnating with only one alkali metal salt, including particularly only potassium metal salts. As discussed in a co-pending provisional application filed by the same entity on the same day, and titled MIXED METAL SORBENTS FOR $CO_2/H_2O$ DISPLACEMENT DESORPTION, which is incorporated by reference in its entirety as if set forth herein, poisoning effects and improved performance can be achieved if two salts can be applied as the impregnating salts.

Another embodiment of the disclosure can include forming the initial support by preparing and extruding a dough to form an extrudate, drying the extrudate, and then calcining the support at about 120° C. to 500° C. forming a support prior to the addition of an impregnating alkali metal salt. Preferably the calcining can be at 200° C. to 400° C., or at 250° C. to 350° C. As discussed in a co-pending provisional application filed by the same entity on the same day, and titled CALCINATION OF $CO_2/H_2O$ DISPLACEMENT DESORPTION SORBENTS, which is incorporated by reference in its entirety as if set forth herein, the lower calcination temperatures can provide better support for the techniques disclosed herein.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

Example 1

Preparation of (9.9% $K_2O$+6.5% $Na_2O/Al_2O_3$)-TMSCl

The aqueous solution containing sodium and potassium carbonates was prepared by dissolving $Na_2CO_3$ and $K_2CO_3$ in distilled $H_2O$. The sorbent was prepared by incipient wetness. 17.275 g of potassium carbonate and 13.248 g of sodium carbonate were dissolved in 60.0 g of di-$H_2O$. The total solution volume of $Na_2CO_3$ and $K_2CO_3$ adjusted with distilled water was 82.7 ml. 100.0 g of alumina extrudates were impregnated with the solution by incipient wetness. The sample was dried in air at 250° F. for 16 hours and calcined in air at 1000° F. for 6 hours. The furnace was ramped at rate of 5° F./min. During the calcination, the air flow was adjusted at 5 volume/volume solid/minute.

The sample of 9.9% $K_2O$+6.5% $Na_2O/Al_2O_3$ was impregnated with 50 ml of trimethylsilane chloride (TMSCl) solution. The TMSCl tetrahydrofuran solution concentration was 1.0 M. After impregnation, the sample was placed in the vacuum drying oven at room temperature for 4 hours, and at 151° F. with nitrogen flow overnight to remove any residual tetrahydrofuran solvent.

Example 2

Preparation of ($Na_2CO_3$+$K_2CO_3$) Supported on $SiO2/Al_2O_3$

The solution containing hydrosil was prepared by mixing 66.65 g of hydrosil in 30 g of water. The total volume of hydrosil was adjusted with water until the volume of the solution reached to 99.18 ml. 120 g of $Al_2O_3$ extrudates were impregnated with the hydrosil aqueous solution by incipient wetness. The sample was dried in air at 120° C. for 16 hours. The sample was calcined in air at 1000° F. for 6 hours. The furnace was ramped at rate of 5° F./min. During the calcination, the air flow was adjusted at 5 volume/volume solid/minute. $SiO_2$ loading on $Al_2O_3$ support was 10 wt %.

$SiO_2$ treated $Al_2O_3$ support was used for deposition of sodium and potassium carbonates. The aqueous solution containing sodium and potassium carbonates was prepared by dissolving $Na_2CO_3$ and $K_2CO_3$ in distilled $H_2O$. The sorbent was prepared by incipient wetness. 17.275 g of potassium carbonate and 13.248 g of sodium carbonate were dissolved in 50.0 g of di-$H_2O$. The total solution volume of $Na_2CO_3$ and $K_2CO_3$ adjusted with distilled water was 74.1 ml. 100.0 g of SiO2 treated $Al_2O_3$ support was impregnated with the solution by incipient wetness. The sample was dried in air at 250° F. for 16 hours and calcined in air at 1000° F. for 6 hours. The furnace was ramped at rate of 5° F./min. During the calcination, the air flow was adjusted at 5 volume/volume solid/minute. The sorbent contains 9.9% $K_2O$ and 6.5% $Na_2O$ as K and Na loadings.

Example 3

Preparation of ($Na_2CO_3$+$K_2CO_3$) Supported on 10 wt % $Al_2O_3$ Treated SiO2

The solution containing aluminum isopropoxide was prepared by dissolving 53.40 g of aluminum isopropoxide in 50 ml of isopropanol. The total volume of aluminum isopropoxide was adjusted with isopropanol until the volume of the solution reached to 101.5 ml. 120.0 g of silica extrudates were impregnated with the aluminum isopropoxide solution by incipient wetness. After impregnation, the sample was placed in the vacuum drying oven at 50° C. for 16 hours to remove residual isopropanol solvent. The sample was dried again in air at 120° C. for 16 hours. The sample was calcined in air at 1000° F. for 6 hours. The furnace was ramped at rate of 5° F./min. During the calcination, the air flow was adjusted at 5 volume/volume solid/minute. $Al_2O_3$ loading on $SiO_2$ support was 10 wt %.

$Al_2O_3$ treated $SiO_2$ support was used for deposition of sodium and potassium carbonates. The aqueous solution containing sodium and potassium carbonates was prepared by dissolving $Na_2CO_3$ and $K_2CO_3$ in distilled $H_2O$. The sorbent was prepared by incipient wetness. 17.275 g of potassium carbonate and 13.248 g of sodium carbonate were dissolved in 50.0 g of di-$H_2O$. The total solution volume of $Na_2CO_3$ and $K_2CO_3$ adjusted with distilled water was 76.0 ml. 100.0 g of $Al_2O_3$ treated $SiO_2$ support were impregnated with the solution by incipient wetness. The sample was dried in air at 250° F. for 16 hours and calcined in air at 1000° F. for 6 hours. The furnace was ramped at rate of 5° F./min. During the calcination, the air flow was adjusted at 5 volume/volume solid/minute. The sorbent contains 9.9% $K_2O$ and 6.5% $Na_2O$ as K and Na loadings.

Example 4

$CO_2$ Sorption/Steam Displacement Fixed Bed Testing

Simulated natural gas flue gas during fixed bed testing contained 13.6% $CO_2$ and 15.3% $H_2O$ balanced with $N_2$. The fixed bed volume is 100 cc. With the simulated natural gas conditions the flue gas space velocity during screening conditions was 10.56 SCCM/g for 9 minutes and steam regeneration space velocity was 3.74 SCCM/g for 9 minutes. The temperature during adsorption was about 140° C., increasing to approximately 153° C. during sorbent regeneration.

In the single fixed bed, all flow controllers were calibrated to obtain high accuracy in gas flowrates. Whenever a gas is not in use, the flow controller is completely shut to prevent any gas leakage. During adsorption cycle, $N_2$ and $CO_2$ are mixed with steam provided by 500 cc syringe pump. The feed enters the bed by down-flow through a 3-way valve and exits through another 3-way valve. The outlet gas/steam moves through a chiller, and the steam is condensed, collected and measured by an online scale. $N_2$ and $CO_2$ gases pass the chiller and exit to a ZRE $CO_2$ analyzer which measures the breakthrough $CO_2$ concentration. During regeneration cycle, both the 3-way valves are switched to allow steam controlled by 1000 cc syringe pump to enter the bed by up-flow and exit via a different path toward a second chiller. The steam is condensed and collected by online scale for measurement of water out in regeneration. $CO_2$ passes the chiller and is diluted with $N_2$ before entering the ZRE $CO_2$ analyzer which detects the desorbed $CO_2$ concentration. Both syringe pumps are continuously running through a 3-way valve which directs the steam either through the bed or to a by-pass line. The downstream $N_2$ is also used to remove/flush out the condensed water in the exit line at the end of each cycle.

Results and Discussion

The key technical challenges in $CO_2$ displacement desorption process are how to increase sorbent's $CO_2$ sorption capacity and minimize steam usage. Steam generation requires intensive energy consumption and account for the large portion of operating costs. Steam usage in the displacement desorption is divided into two portions. One portion is used to drive off $CO_2$ absorbed on the sorbent. Another portion is water absorbed on the sorbents via hydrogen binding to the hydroxyl groups of the support, which is wasteful. Hydroxyl group concentrations and hydrophobic properties of the sorbents are key factors controlling $H_2O$ uptake on sorbents.

Figure 2:
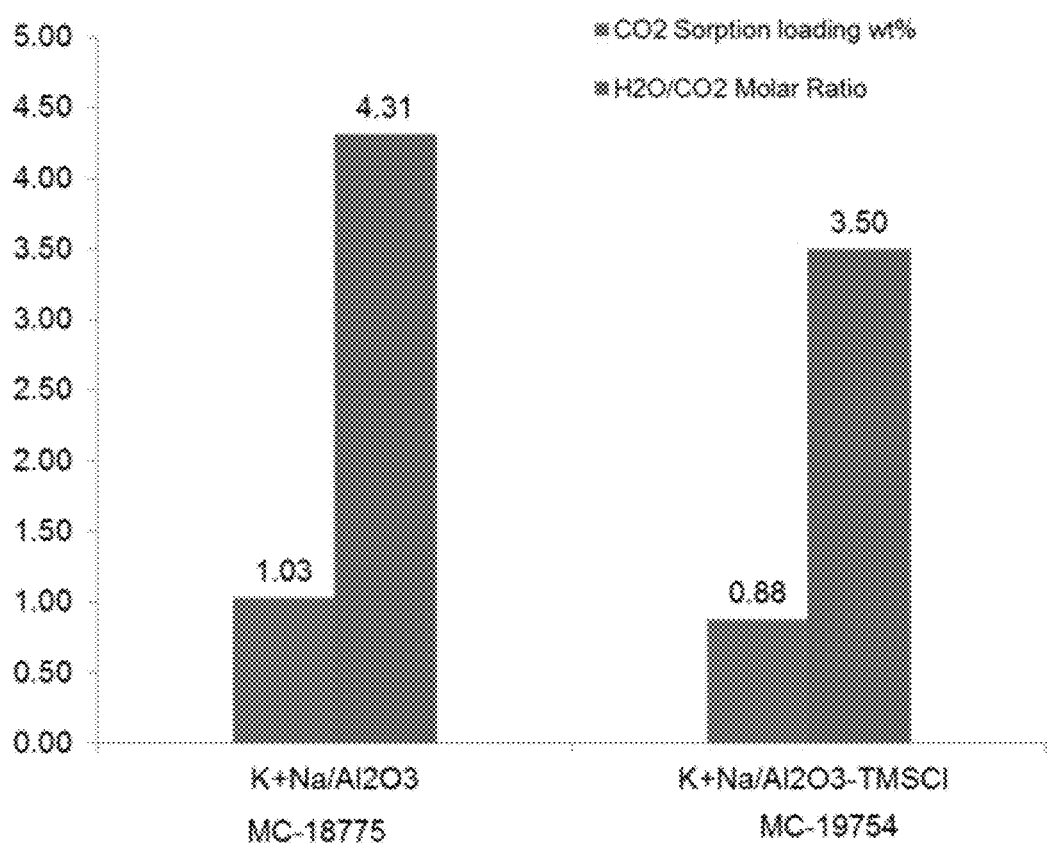
FIG. 2 illustrates the effect of TMS chloride treatment on $K_2CO_3+Na_2CO_3/Al_2O_3$ supports, in accordance with an exemplary embodiment of the disclosure.

The sorbent of (9.9% $K_2O$+6.5% $Na_2O/Al_2O_3$)-TMSCl was prepared by impregnating the sample of 9.9% $K_2O$+ 6.5% $Na_2O/Al_2O_3$ with trimethylsilane chloride (TMSCl) solution. TMSCl treatment was designed to cover hydroxyls of the sorbent to minimize parasitic $H_2O$ on sorbents. It can be seen from FIG. 2, the $H_2O/CO_2$ molar ratio was reduced from the parent sample of 4.31 to 3.50 of TMSCl treated sample. 19% reduction of water usage in the CCS displacement desorption. The sorbent $CO_2$ sorption capacity was also reduced from 1.03 wt % to 0.88 wt %.

Figure 3:
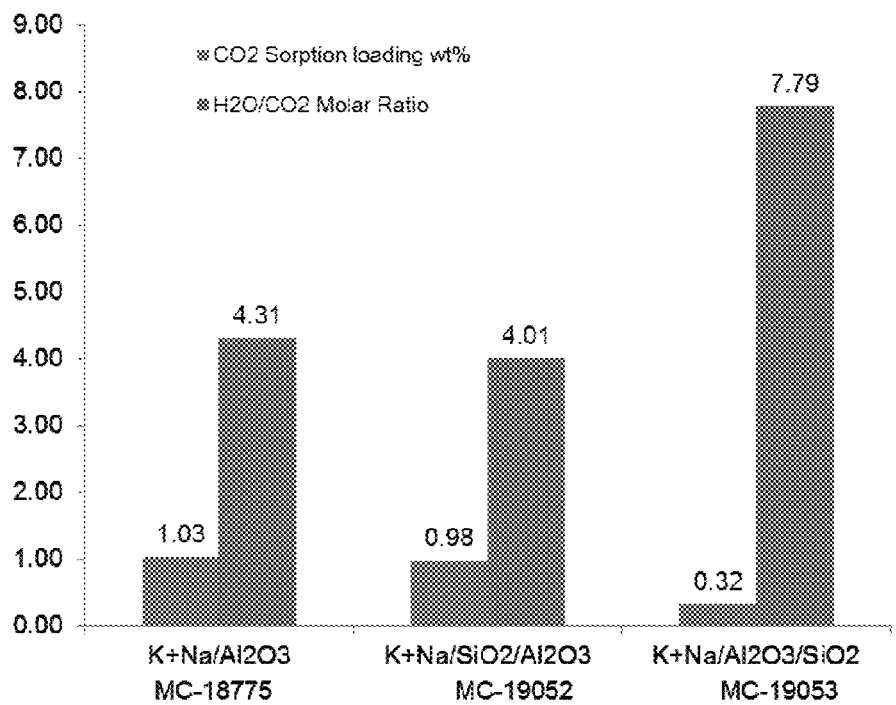
FIG. 3 illustrates the effect of silica and aluminum type supports, including $K_2CO_3+Na_2CO_3$ supported on $SiO_2/Al_2O_3$ and $Al_2O_3/SiO_2$, in accordance with an exemplary embodiment of the disclosure.

FIG. 3 shows CCS performance comparisons of sample of $Na_2CO_3$ and $K_2CO_3$ supported on 10% $SiO_2/Al_2O_3$ (MC-19052) and sample of $Na_2CO_3$ and $K_2CO_3$ supported on $Al_2O_3$ (MC-18775). Because of poor dispersions of $Na_2CO_3$ and $K_2CO_3$ on silica surface, $Na_2CO_3$ and $K_2CO_3$ are preferentially dispersed on alumina surface. Unoccupied support surfaces are predominately hydrophobic silica surfaces. When $Na_2CO_3$ and $K_2CO_3$ are supported on 10% $SiO_2/Al_2O_3$ (MC-19052), its $H_2O/CO_2$ molar ratio is 4.01, which is lower than that of 4.31 on the sample of $Na_2CO_3$ and $K_2CO_3$ supported on $Al_2O_3$ (MC-18775), 7% reduction of water usage. $CO_2$ sorption capacity was, however, slightly reduced to 0.98 wt % on MC-19052 from 1.03 wt % on sample MC-18775. When $Na_2CO_3$ and $K_2CO_3$ are supported on 10% $Al_2O_3/SiO_2$ (MC-19053), its CCS performance is significantly worse. The support surfaces of 10% $Al_2O_3/SiO_2$ are predominated by hydrophobic silica. Poor dispersions of $Na_2CO_3$ and $K_2CO_3$ on silica surface give low $CO_2$ sorption loading. The molar ratio of $H_2O/CO_2$ for sample MC-19053 is also high 7.79, due to relatively low $CO_2$ sorption on the sorbent.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based can be readily utilized as a basis for the design of other structures, methods, and systems for carrying out the several purposes of the embodiments and claims presented in this application. It is important, therefore, that the claims be regarded as including such equivalent constructions.

We claim:

1. A silicon-modified $CO_2/H_2O$ displacement desorption sorbent, comprising
   an aluminum compound support;
   an alkali metal salt impregnated on the aluminum compound support; and
   5% to 20% by weight of silica capping hydroxyl positions on the impregnated aluminum compound support.

2. The sorbent of claim 1, comprising 7% to 15% by weight of silica capping hydroxyl positions on the impregnated aluminum compound support.

3. The sorbent of claim 1, wherein the aluminum compound comprises aluminum oxide, aluminum oxide hydroxide, aluminum hydroxide, boehmite, or pseudoboehmite.

4. The sorbent of claim 1, wherein the alkali metal salt comprises a potassium salt, a sodium salt, a lithium salt, or combinations thereof.

5. The sorbent of claim 1, wherein the alkali metal salt is greater than about 5 weight % of the sorbent as $M_2O$.

6. The sorbent of claim 1, wherein the alkali metal salt is greater than about 8 weight % of the sorbent as $M_2O$.

7. A silicon-modified $CO_2/H_2O$ displacement desorption sorbent, comprising an aluminum compound support;
an alkali metal salt impregnated on the aluminum compound support; and
5% to 15% by weight of silica capping hydroxyl positions on the impregnated aluminum compound support.

8. The sorbent of claim 7, comprising 7% to 15% by weight of silica capping hydroxyl positions on the impregnated aluminum compound support.

9. The sorbent of claim 7, wherein the aluminum compound comprises aluminum oxide, aluminum oxide hydroxide, aluminum hydroxide, boehmite, or pseudoboehmite.

10. The sorbent of claim 7, wherein the alkali metal salt comprises a potassium salt, a sodium salt, a lithium salt, or combinations thereof.

11. The sorbent of claim 7, wherein the alkali metal salt comprises a potassium salt, a sodium salt, or combinations thereof.

12. The sorbent of claim 7, wherein the alkali metal salt is greater than about 5 weight % of the sorbent as $M_2O$.

13. The sorbent of claim 7, wherein the alkali metal salt is greater than about 8 weight % of the sorbent as $M_2O$.

* * * * *